March 22, 1927.

U. FUJIMOTO

X-RAY TUBE

Filed July 23, 1923

Ukichi Fujimoto
Inventor

By Alexander Farell
Attorneys

Patented Mar. 22, 1927.

1,621,926

UNITED STATES PATENT OFFICE.

UKICHI FUJIMOTO, OF TOKYO, JAPAN.

X-RAY TUBE.

Application filed July 23, 1923, Serial No. 653,237, and in Japan December 22, 1922.

This invention relates to an improvement in an X-ray tube, consisting in forming the anti-cathode with any suitable material in the shape of a wheel provided with an axle and bearing, the said axle being provided at its other end with an electromotive means; and in supporting the said axle and bearing within a metallic cylinder, which is thrust into a side tube and firmly fixed at a proper position, so that the anti-cathode can be rotated within the tube and the cathode rays can be thrown thereupon. The object of this invention is to make the anti-cathode bear on account of its rotation, a pointed and strong generation of Röntgen rays.

The accompanying drawing shows an example of my invention, in which—

In the drawing, the same reference number refers to the same parts.

Figure 1:
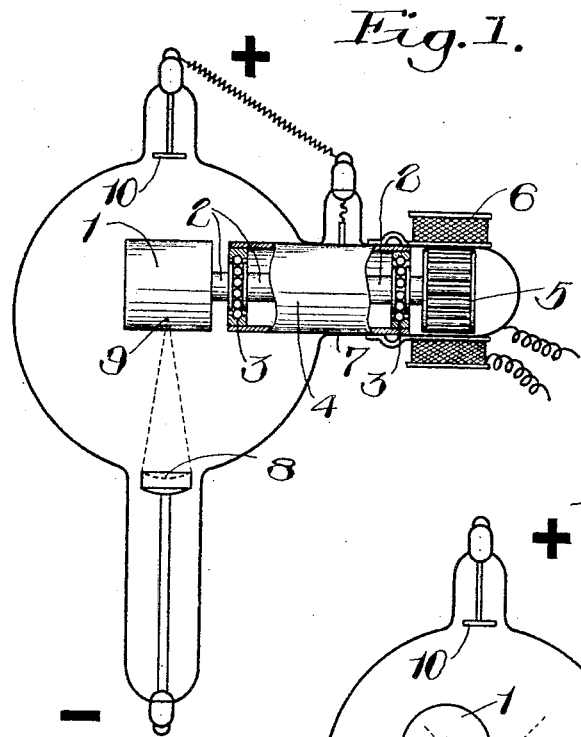
Fig. 1 is a frontal view, the parts cut off showing the internal arrangement of electromotive arrangement, and the axle and bearing within the metallic cylinder, the small balls seen therein being the balls of the ball bearings; and the dotted lines between the cathode and anti-cathode designating the position at which the cathode rays collect.
Figure 2:
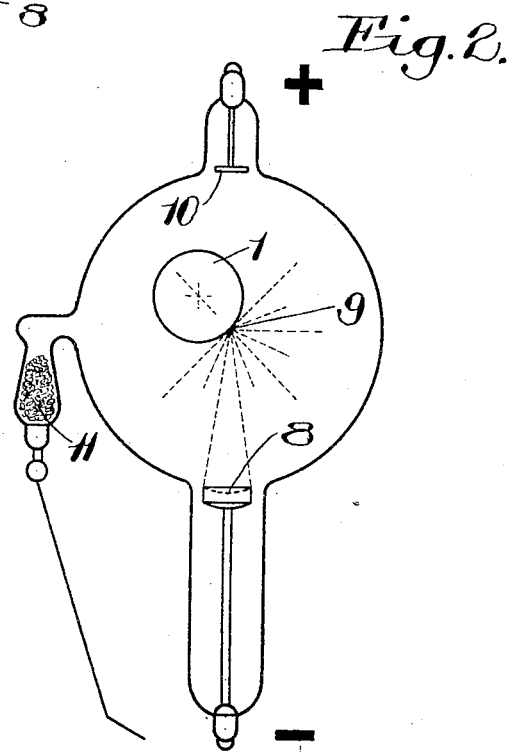
Fig. 2 shows relative positions of the cathode and anti-cathode as seen from a side of the tube, the dotted lines showing the position at which the cathode rays meet.
Figure 3:
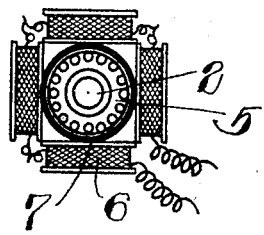
Fig. 3 shows a frontal view of the electromotive means of the anti-cathode.

This invention consists in an anti-cathode of a wheel-like shape made with any suitable material, mounted on one end of an axle to the other end of which is fixed a rotor to be rotated by an electrical means and which is supported on bearings, so that the anti-cathode can be rotated. The bearings are firmly fixed to a metallic cylinder which is held in its position within a side-tube, in such way that the anti-cathode projects into the midst of the main tube opposing the cathode and making a right angle therewith, and the discharge of the cathode rays collects and impinges upon the surface of the anti-cathode at an angle of 45° with a tangential line thereof. The side tube containing the metallic cylinder is surrounded with magnetic coils to which a current of electricity is sent from an electrical source which is perfectly insulated from the earth. Then the magnetic force generated by the current of electricity induces the rotor to rotate, and consequently the anti-cathode fixed on the same axle rotates. In this way the point at which the discharge of the cathode rays collects, always changing, the heat received by that point will be partly dispersed by divergent reflection and part absorbed will be radiated from its wide surface. Thus the anti-cathode will be enabled to bear a comparatively sharp pointed and strong beam of X-rays. The following is an example of carrying my invention into practice:—

The anti-cathode (1) within the tube is formed with any suitable material, and is a wheel in shape fixed to one end of an axle (2) and which is mounted on bearings (3), with any suitable electrically operated rotor (5). The axle (2) together with the bearings (3) which support it, is inserted within a side tube (7), being held fast in a metallic cylinder (4). The anti-cathode (1) is positioned in such a way that it projects into the midst of the tube, confronting the cathode, making a right angle with it, and the focus, or the point at which the cathode rays collect, being so placed on the surface of the anti-cathode that the rays make an angle of 45° with the tangential line. In order to rotate the anti-cathode, there are provided around the side tube (7), in which the rotor (5) is contained, magnetic coils (6), to which current of electricity is sent from any electric source which is perfectly insulated from the ground. The magnetic coils being thus magnetized, will induce the rotor (5) within the side tube (7), thus ultimately causing the anti-cathode (1) to rotate at any desired speed, and enabling it to present different points for the collection of the cathode rays. (10) is the anode, and (11) is a vacuum regulator.

Claims:

1. In an X-ray tube having a side tube, a cylinder fixed within said side tube; bearings in said cylinder; an axle rotatably mounted in said bearings; an anti-cathode wheel mounted on said axle; a rotor on said axle; coils mounted around the side tube adjacent the rotor; and means for electrically exciting said coils whereby said rotor will be rotated.

2. In an X-ray tube having a side tube, a metallic cylinder fixed within said side tube; ball bearings in said cylinder; an axle rotatably mounted in said bearings; an anticathode wheel mounted on the inner end of said axle; an inductively operated rotor mounted on the other end of said axle; a plurality of coils mounted around the side tube adjacent the rotor; and means for electrically exciting said coils whereby said rotor will be rotated.

In testimony whereof I have affixed my signature.

UKICHI FUJIMOTO.